United States Patent
Yoshitomi (10) Patent No.: US 11,276,867 B2
(45) Date of Patent: Mar. 15, 2022

(54) FUEL CELL STACK AND END PLATE

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 16/575,741

(22) Filed: Sep. 19, 2019

(65) Prior Publication Data

US 2020/0099067 A1 Mar. 26, 2020

(30) Foreign Application Priority Data

Sep. 25, 2018 (JP) .............................. JP2018-178909

(51) Int. Cl.
| | |
|---|---|
| *H01M 8/0258* | (2016.01) |
| *H01M 8/2465* | (2016.01) |
| *H01M 8/2483* | (2016.01) |

(52) U.S. Cl.
CPC ....... *H01M 8/0258* (2013.01); *H01M 8/2465* (2013.01); *H01M 8/2483* (2016.02); *H01M 2250/20* (2013.01)

(58) Field of Classification Search
None
See application file for complete search history.

(56) References Cited

U.S. PATENT DOCUMENTS

| | | | |
|---|---|---|---|
| 2012/0034545 A1* | 2/2012 | Yamaura | H01M 8/04201 429/460 |
| 2020/0185752 A1* | 6/2020 | Naito | H01M 8/2475 |
| 2020/0303760 A1* | 9/2020 | Naito | H01M 8/2475 |

FOREIGN PATENT DOCUMENTS

JP 2016-134335 7/2016

* cited by examiner

*Primary Examiner* — Jonathan Crepeau
(74) *Attorney, Agent, or Firm* — Amin, Turocy & Watson, LLP (57) ABSTRACT

A fuel cell stack includes a plurality of power generation cells and an end plate. A plurality of fluid passages for allowing a fuel gas, an oxygen-containing gas, and a coolant to flow independently in a stacking direction are provided in the plurality of power generation cells. The end plate includes: holes which penetrate through the end plate in a thickness direction and are connected to the fluid passages, and to which manifolds are connected; and flow channels formed in the end plate, and connected to the fluid passages. The flow channels include first and second lateral openings opened to a surface which is different from a surface where the holes are opened.

9 Claims, 6 Drawing Sheets

FUEL CELL STACK AND END PLATE

CROSS-REFERENCE TO RELATED APPLICATION

This application is based upon and claims the benefit of priority from Japanese Patent Application No. 2018-178909 filed on Sep. 25, 2018, the contents of which are incorporated herein by reference.

BACKGROUND OF THE INVENTION

Field of the Invention

The present invention relates to a fuel cell stack including a plurality of power generation cells stacked together in a stacking direction, and end plates provided at both ends of the power generation cells in the stacking direction. Further, the present invention relates to an end plate applicable to the fuel cell stack.

Description of the Related Art

A fuel cell stack includes a plurality of power generation cells that are stacked together, and each of the power generation cells performs power generation consuming a fuel gas and an oxygen-containing gas supplied to the power generation cells. Further, a coolant for regulating the temperature during power generation is supplied to the fuel cell stack. To this end, according to the disclosure of Japanese Laid-Open Patent Publication No. 2016-134335, manifolds for supplying the fuel gas, the oxygen-containing gas, and the coolant to the power generation cells, and manifolds for discharging the fuel gas, the oxygen-containing gas, and the coolant from the power generation cells are connected to an end plate provided at one end of the fuel cell stack.

SUMMARY OF THE INVENTION

In the actual system structure of the fuel cell stack, a plurality of devices of a fuel cell system (a fuel gas system apparatus and an oxygen-containing gas system apparatus) are provided in addition to the manifolds, at positions outside, and adjacent to the end plate. Further, as disclosed in Japanese Laid-Open Patent Publication No. 2016-134335, a plurality of holes of the end plate, for connecting the manifolds to the end plate, are positioned close to one another, and formed to have a large size in comparison with fluid passages in the fuel cell stack, in order to attach joint members of the manifolds to the holes, respectively.

Therefore, the strength of the end plate itself tends to be decreased, in the portion near positions to which the manifolds are connected. Further, at the positions outside and adjacent to the end plate, the devices and a large number of manifolds are provided closely to one another. Therefore, the freedom of layout is constrained significantly.

The present invention has been made taking the above circumstances into account, and an object of the present invention is to provide a fuel cell stack and an end plate which have simple structure and make it possible to improve the freedom of the layout and increase the strength of the portion near positions to which manifolds are connected.

In order to achieve the above object, according to an aspect of the present invention, provided is a fuel cell stack including a plurality of power generation cells configured to perform power generation consuming a fuel gas and an oxygen-containing gas supplied to the power generation cells, the temperature of the power generation cells being regulated by a coolant supplied to the power generation cells, and an end plate provided at an end in a stacking direction in which the power generation cells are stacked together. The power generation cells include first to third fluid passages configured to allow the fuel gas, the oxygen-containing gas, and the coolant to flow independently in the stacking direction. The end plate includes: holes which penetrate through the end plate in a thickness direction and are connected to the first and second fluid passages, and to which manifolds are connected; and a flow channel formed in the end plate, and connected to the third fluid passage. The flow channel includes a channel port opened to a surface which is different from a surface where the holes are opened.

Further, in order to achieve the above object, according to an aspect of the present invention, provided is an end plate of a fuel cell stack provided at an end in a stacking direction in which a plurality of power generation cells are stacked together. The power generation cells include first to third fluid passages configured to allow a fuel gas, an oxygen-containing gas, and a coolant to flow independently in the stacking direction, and the power generation cells are configured to perform power generation consuming the fuel gas and the oxygen-containing gas supplied to the power generation cells, the temperature of the power generation cells being regulated by the coolant supplied to the power generation cells. The end plate includes: holes which penetrate through the end plate in a thickness direction and are connected to the first and second fluid passages, and to which manifolds are connected; and a flow channel formed in the end plate, and connected to the third fluid passage. The flow channel includes a channel port opened to a surface which is different from a surface where the holes are opened.

According to the present invention, the fuel cell stack and the end plate have simple structure and make it possible to improve the freedom of the layout and increase the strength of the portion near the positions to which the manifolds are connected.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference the accompanying drawings.

First Embodiment

Figure 1:
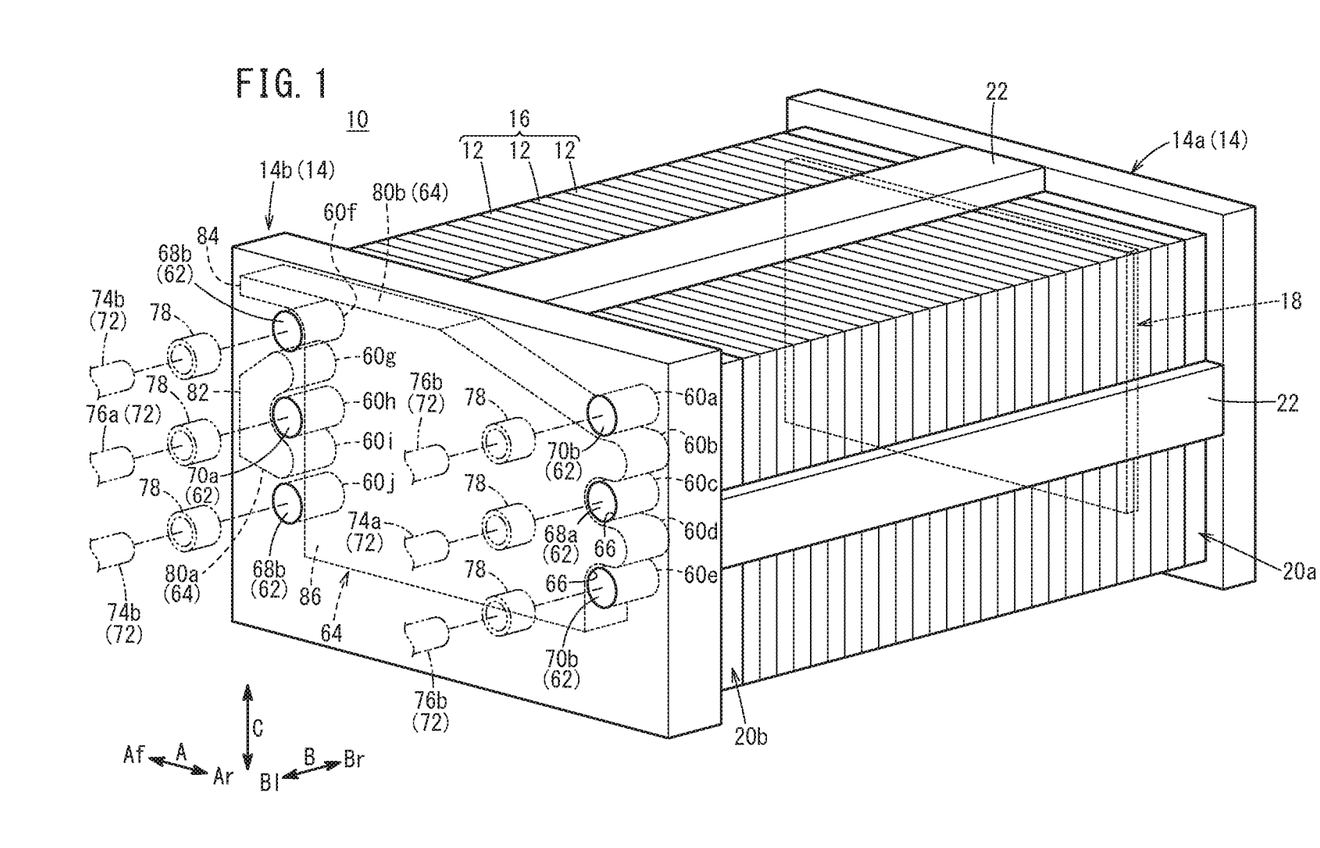
FIG. 1 is a perspective view showing a fuel cell stack and end plates according to a first embodiment of the present invention.

As shown in FIG. 1, a fuel cell stack 10 according to a first embodiment includes a plurality of power generation cells 12 which perform power generation consuming a fuel gas and an oxygen-containing gas supplied to the power generation cells 12, and the temperature of which is regulated by a coolant supplied to the power generation cells 12. Further, the fuel cell stack 10 includes end plates 14 provided at both ends in a stacking direction in which the plurality of power generation cells 12 are stacked together. For example, the fuel cell stack 10 is placed in a casing (not shown), and mounted in a motor room of a fuel cell automobile.

In the state where the fuel cell stack 10 is mounted in the fuel cell automobile, the plurality of power generation cells 12 are stacked together in a vehicle width direction (indicated by an arrow B) perpendicular to a vehicle length direction (indicated by an arrow A) in a manner that electrode surfaces of the power generation cells 12 are oriented upright to form a stack body 16. It should be noted that the plurality of power generation cells 12 may be stacked together in a gravity direction (indicated by an arrow C), or may be stacked together in the vehicle length direction.

At one end (a side indicated by an arrow Br) of the power generation cells 12 in the stacking direction (indicated by an arrow B), a terminal plate 18 is provided. An insulator 20a is provided outside the terminal plate 18, and a first end plate 14a as one of end plates 14 is provided outside the insulator 20a. At the other end (a side indicated by an arrow B1) of the stack body 16 in the stacking direction, a terminal plate (not shown) is provided. An insulator 20b is provided outside the terminal plate, and a second end plate 14b is provided outside the insulator 20b.

The terminal plates 18 at both ends in the stacking direction are plate members made of metal for collecting electrical energy from the power generation cells 12, and power collection terminals (not shown) protrude from predetermined positions on the stack body 16. The insulators 20a, 20b are made of insulating material such as polycarbonate (PC), phenol resin, etc. Each of the first and second end plates 14a, 14b is in the form of a laterally elongated (or longitudinally elongated) flat plate. Bars 22 are coupled between the sides of the first and second end plates 14a, 14b. Both ends of each of the bars 22 are fixed to inner surfaces of the end plates 14, for applying a tightening load to the stack body 16 (the power generation cells 12) in the stacking direction.

Figure 2:
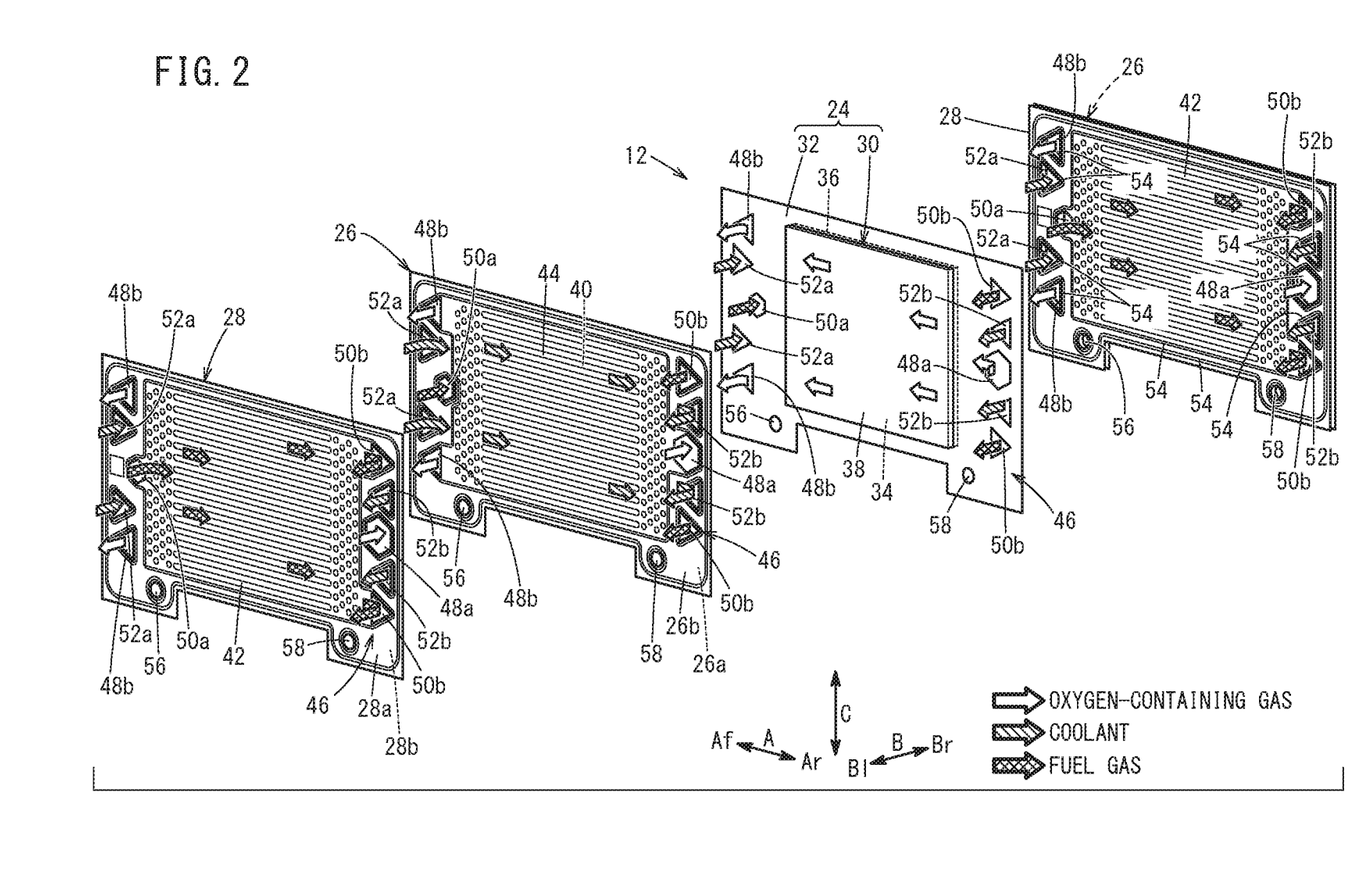
FIG. 2 is an exploded perspective view showing structure of a power generation cell of a fuel cell stack.

As shown in FIG. 2, each of the power generation cells 12 includes a resin frame equipped MEA 24, and two separators (hereinafter also referred to as a "first separator 26" and a "second separator 28", respectively) sandwiching the resin frame equipped MEA 24. Each of the first and second separators 26, 28 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Outer ends of the first and second separators 26, 28 are joined together by welding, brazing, crimping, etc. to form a single joint separator.

The resin frame equipped MEA 24 includes a membrane electrode assembly 30 (hereinafter referred to as the "MEA 30"), and a resin frame member 32 joined to the outer peripheral portion of the MEA 30 and provided around the outer peripheral portion. The MEA 30 includes an electrolyte membrane 34, an anode 36 provided on one surface of the electrolyte membrane 34, and a cathode 38 provided on the other surface of the electrolyte membrane 34. It should be noted that the electrolyte membrane 34 may be configured to protrude outward, without using the resin frame member 32 for the MEA 30. Further, frame shaped resin films may be provided on both sides of the electrolyte membrane 34 which protrudes outward.

The electrolyte membrane 34 includes a solid polymer electrolyte membrane (cation ion exchange membrane). For example, the solid polymer electrolyte membrane is a thin membrane of perfluorosulfonic acid containing water. A fluorine based electrolyte may be used as the electrolyte membrane 34. Alternatively, an HC (hydrocarbon) based electrolyte may be used as the electrolyte membrane 34.

The first separator 26 has an oxygen-containing gas flow field 40 as a passage of the oxygen-containing gas (e.g., the air containing oxygen) on its surface 26a facing the cathode 38 of the resin frame equipped MEA 24 (in FIG. 2, for convenience, the direction of the flow of the oxygen-containing gas is shown on the cathode 38 of the MEA 30). The oxygen-containing gas flow field 40 includes straight flow grooves (or wavy flow grooves) formed between a plurality of ridges extending along the first separator 26 in the horizontal direction indicated by the arrow A.

The second separator 28 has a fuel gas flow field 42 as a passage of the fuel gas (e.g., the hydrogen-containing gas) on its surface 28a facing the anode 36 of the resin frame equipped MEA 24. The fuel gas flow field 42 includes straight flow grooves (or wavy flow grooves) formed between a plurality of ridges extending along the second separator 28 in the direction indicated by the arrow A.

A coolant flow field 44 as a passage of a coolant (e.g., water) is formed between a surface 26b of the first separator 26 and a surface 28b of the second separator 28 that are joined together. When the first separator 26 and the second separator 28 are stacked together, the coolant flow field 44 is formed between the back surface of the oxygen-containing gas flow field 40 of the first separator 26 and the back surface of the fuel gas flow field 42 of the second separator 28.

Further, a plurality of fluid passages 46 are provided on both sides of the power generation cells 12 in the long side direction indicated by the arrow A (a side indicated by an arrow Ar, and a side indicated by an arrow Af), for allowing the oxygen-containing gas, the fuel gas, and the coolant to flow independently in the stacking direction of the power generation cells 12.

The plurality of fluid passages 46 provided on the side indicated by the arrow Ar (on the rear side of the fuel cell stack 10) include an oxygen-containing gas supply passage 48a as a first fluid passage, two fuel gas discharge passages 50b as second fluid passages, and two coolant discharge passages 52b as third fluid passages. These fluid passages 46 are arranged in substantially a vertical direction. The oxygen-containing gas supply passage 48a, the two coolant discharge passages 52b, and the two fuel gas discharge passages 50b penetrate through the power generation cells 12 in the stacking direction.

The oxygen-containing gas supply passage 48a is formed at the center of the five fluid passages 46 arranged in the direction indicated by the arrow C. The two coolant discharge passages 52b are formed adjacent to, and above and below the oxygen-containing gas supply passage 48a, so as to sandwich the oxygen-containing gas supply passage 48a. The two fuel gas discharge passages 50b are formed above the upper coolant discharge passage 52b and below the lower coolant discharge passage 52b, so as to sandwich the oxygen-containing gas supply passage 48a and the two coolant discharge passages 52b.

The plurality of fluid passages 46 provided on the side indicated by the arrow Af (on the front side of the fuel cell stack 10) include two oxygen-containing gas discharge passages 48b as first fluid passages, a fuel gas supply passage 50a as a second fluid passage, and two coolant supply passages 52a as third fluid passages. The fluid passages 46 are arranged substantially in the direction indicated by the arrow C. The two oxygen-containing gas discharge passages 48b, the fuel gas supply passage 50a, and the two coolant supply passages 52a penetrate through the power generation cells 12 in the stacking direction.

The fuel gas supply passage 50a is formed at the center of the five fluid passages 46 arranged in the direction indicated by the arrow C. The two coolant supply passages 52a are provided adjacent to, and above and below the fuel gas supply passage 50a, so as to sandwich the fuel gas supply passage 50a. The two oxygen-containing gas discharge passages 48b are provided above the upper coolant supply passage 52a and below the lower coolant supply passage 52a, so as to sandwich the fuel gas supply passage 50a and the two coolant supply passages 52a.

Further, in the embodiment of the present invention, each of the oxygen-containing gas supply passage 48a and the fuel gas supply passage 50a has a hexagonal shape. Further, the channel cross sectional area of the fuel gas supply passage 50a is smaller than the channel cross sectional area of the oxygen-containing gas supply passage 48a. Each of the oxygen-containing gas discharge passages 48b, the fuel gas discharge passages 50b, the coolant supply passages 52a, and the coolant discharge passages 52b has a substantially triangular shape.

The oxygen-containing gas flow field 40 is connected to (in fluid communication with) the oxygen-containing gas supply passage 48a and the two oxygen-containing gas discharge passages 48b. The oxygen-containing gas is supplied from the oxygen-containing gas supply passage 48a to the oxygen-containing gas flow field 40, and the oxygen-containing gas flows in the direction indicated by the arrow A. Then, the oxygen-containing gas is discharged into the two oxygen-containing gas discharge passages 48b. Each of the two oxygen-containing gas discharge passages 48b has a triangular shape having one side (bottom side) oriented toward the oxygen-containing gas flow field 40.

The fuel gas flow field 42 is connected to (in fluid communication with) the fuel gas supply passage 50a and the two fuel gas discharge passages 50b. The fuel gas is supplied from the fuel gas supply passage 50a to the fuel gas flow field 42, and the fuel gas flows in the direction indicated by the arrow A (opposite to the oxygen-containing gas). Then, the fuel gas is discharged into the two fuel gas discharge passages 50b. Each of the two fuel gas discharge passages 50b has a triangular shape having one side (bottom side) oriented toward the fuel gas flow field 42.

The coolant flow field 44 is connected to (in fluid communication with) the two coolant supply passages 52a and the two coolant discharge passages 52b. The coolant is supplied from the two coolant supply passages 52a to the coolant flow field 44, and the coolant flows in the direction indicated by the arrow A (in the same direction as the fuel gas). Then, the coolant is discharged into the two coolant discharge passages 52b. Each of the two coolant supply passages 52a and each of the two coolant discharge passages 52b has a triangular shape having one vertex oriented toward the coolant flow field 44.

It should be noted that the layout, the number, and the shapes of the oxygen-containing gas supply passage 48a, the oxygen-containing gas discharge passages 48b, the fuel gas supply passage 50a, the fuel gas discharge passages 50b, the coolant supply passages 52a, and the coolant discharge passages 52b are not limited to the illustrated embodiment. The fluid passages 46 may be designed as necessary depending on the required specification.

A plurality of metal bead seals (seals 54) are formed integrally with the surfaces of the first and second separators 26, 28, e.g., by press forming, to face the resin frame equipped MEA 24. The seals 54 may be in the form of ridge shaped elastic seals made of elastic material, instead of the metal bead seals.

Further, the power generation cells 12 have a first drain 56 for discharging water produced at the cathode 38 during operation (power generation) of the fuel cell stack 10. The first drain 56 extends through the power generation cells 12 at a position where the first and second separators 26, 28 and the resin frame member 32 are overlapped with each other. The first drain 56 is connected to the oxygen-containing gas discharge passages 48b through a first connection channel (not shown) provided at an end (e.g., the insulator 20b) of the stack body 16.

Further, the power generation cells 12 have a second drain 58 for discharging water produced at the anode 36 during operation (power generation) of the fuel cell stack 10. The second drain 58 extends through the power generation cells 12 at a position where the first and second separators 26, 28, and the resin frame member 32 are overlapped with each other. The second drain 58 is connected to the fuel gas discharge passages 50b through a second connection channel (not shown) provided at an end (e.g., the insulator 20b) of the stack body 16.

As shown in FIGS. 1 and 2, a plurality of inner openings 60a to 60j are provided on a surface of the second end plate 14b facing the power generation cells 12. The inner openings 60a to 60j are connected respectively to the plurality of fluid passages 46 (the oxygen-containing gas supply passage 48a, the oxygen-containing gas discharge passages 48b, the fuel gas supply passage 50a, the fuel gas discharge passages 50b, the coolant supply passages 52a, and the coolant discharge passages 52b) of the stack body 16 including the insulator 20b. Further, the second end plate 14b has a plurality of (six) holes 62 connected to the plurality of inner openings 60a, 60c, 60e, 60f, 60h, 60j, and a plurality of (two) flow channels 64 connected to the plurality of inner openings 60b, 60d, 60g, 60i.

The six holes 62 penetrate through the second end plate 14b in the thickness direction, and are connected to outer openings 66 formed outside the second end plate 14b. The holes 62 penetrate through the second end plate 14b, at positions facing the oxygen-containing gas supply passage 48a, the two oxygen-containing gas discharge passages 48b, the fuel gas supply passage 50a, and the two fuel gas discharge passages 50b, among the fluid passages 46 described above. Hereinafter, the hole connected to the oxygen-containing gas supply passage 48a will be referred to as an oxygen-containing gas inlet hole 68a, and the holes connected to the oxygen-containing gas discharge passages 48b will be referred to as oxygen-containing gas outlet holes 68b. The hole connected to the fuel gas supply passage 50a will be referred to as a fuel gas inlet hole 70a, and the holes connected to the fuel gas discharge passages 50b will be referred to as fuel gas outlet holes 70b.

In a front view viewed from the outside of the second end plate 14b, each of the holes 62 has a circular shape having an area which is larger than the area of the facing (corresponding) fluid passage 46. The fluid passages 46 are provided inside the holes 62. Manifolds 72 (pipes) as passages of the reactant gases are connected to the holes 62, respectively. That is, an oxygen-containing gas supply manifold 74a is connected to the oxygen-containing gas inlet hole 68a. Oxygen-containing gas discharge manifolds 74b are connected to the two oxygen-containing gas outlet holes 68b, respectively, and merged at an intermediate position into a single pipe. Likewise, a fuel gas supply manifold 76a is connected to the fuel gas inlet hole 70a. Fuel gas discharge manifolds 76b are connected to the two fuel gas outlet holes 70b, respectively, and merged at an intermediate position into a single pipe.

A joint member 78 for fixing each manifold 72 to the second end plate 14b is placed in each of the holes 62. For example, the joint member 78 is a cylindrical member for axially sealing the space between the inner surface of the hole 62 and the outer surface of the manifold 72. Further, though not shown, in the cylinder of the joint member 78, the inner surface of the hole 62 closer to the outer opening 66 is formed to have a circular shape which is connectable to the manifold 72, and the inner surface of the hole 62 closer to the inner openings 60a to 60j matches the shapes (hexagonal or triangular shape) of the facing (corresponding) fluid passage 46.

For example, the joint member 78 is made of elastic member having a suitable elastic force, and is tightly fixed to the inner surface of the hole 62. The manifold 72 is inserted into an intermediate position of the joint member 78 in the axial direction, and axially sealed. Thus, the manifold 72 is fixed to the second end plate 14b (i.e., the fuel cell stack 10) in an air-tight manner.

Figure 3A:
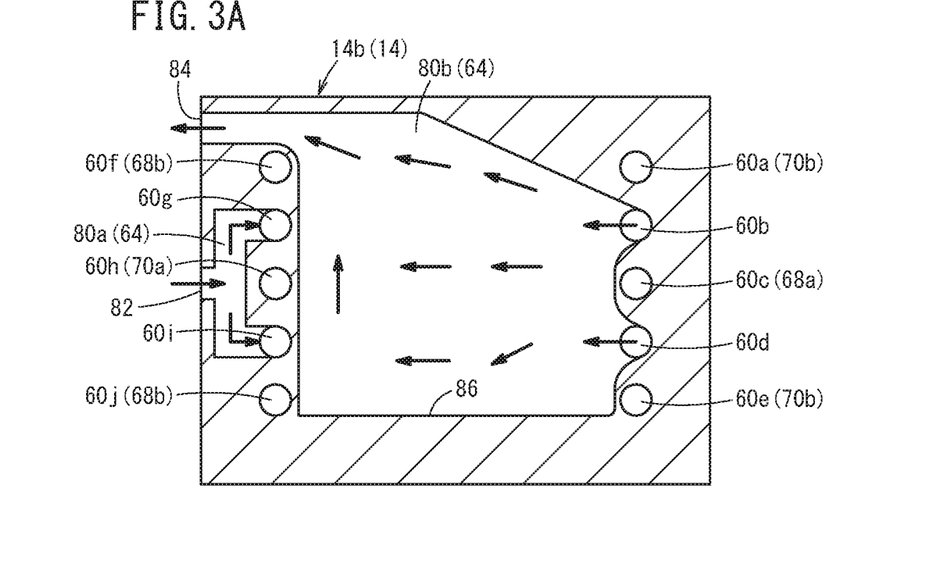
FIG. 3A is a cross sectional view showing flows of a coolant in flow channels.

The two flow channels 64 of the second end plate 14b are formed independently from each other (isolated from each other), and function to allow the coolant to flow in surface directions (indicated by the arrow A and the arrow C) inside the second end plate 14b. The two flow channels 64 occupy the majority part of the second end plate 14b in the form of a flat plate. As shown in FIGS. 1 and 3A, in a front view of the second end plate 14b, the two flow channels 64 include a coolant inlet channel 80a connected to the two coolant supply passages 52a through the inner openings 60g, 60i, and a coolant outlet channel 80b connected to the two coolant discharge passages 52b through the inner openings 60b, 60d.

The coolant inlet channel 80a is connected to a first lateral opening 82 (channel port) provided in a side surface of the second end plate 14b on a side indicated by the arrow Af. The coolant inlet channel 80a extends from the first lateral opening 82 in the horizontal direction by a short distance, and is then branched into upper and lower channels to form a bifurcated channel extending toward the two inner openings 60g, 60i facing the coolant supply passages 52a.

The coolant outlet channel 80b is connected to a second lateral opening 84 (channel port). The first lateral opening 82 and the second lateral opening 84 are provided on the same side surface of the coolant inlet channel 80a. The second lateral opening 84 is arranged above the first lateral opening 82. The coolant outlet channel 80b includes an enlarged space 86. The enlarged space 86 extends from the second lateral opening 84 in the horizontal direction, passes the hole 62 of the second end plate 14b on the side indicated by the arrow Af, and is then widely expanded downward and in the horizontal direction. The channel cross sectional area of the enlarged space 86 is larger than the channel cross sectional area of the second lateral opening 84. More specifically, the enlarged space 86 extends from a position above the holes 62 that are arranged vertically, on the side of the second end plate 14b indicated by the arrow Af, to a position below the lowermost hole 62. The enlarged space 86 extends in the horizontal direction in this vertical range. Then, the side of the enlarged space 86 indicated by the arrow Ar opposite to the second lateral opening 84 is connected to the two inner openings 60b, 60d.

In the enlarged space 86, the positions adjacent to the oxygen-containing gas inlet hole 68a, the oxygen-containing gas outlet holes 68b, the fuel gas inlet hole 70a, and the fuel gas outlet holes 70b are positioned as closely as possible in a range where the strength of each hole 62 is not decreased. It should be noted that, in the enlarged space 86, support poles, walls, or the like for supporting an area of the enlarged space 86 between the inner wall and the outer wall of the second end plate 14b may be provided. The materials of the first and second end plates 14a, 14b are not particularly limited. The first and second end plates 14a, 14b may be made of either metal or resin.

The fuel cell stack 10 and the end plates 14 according to the embodiment of the present invention basically have the structure described above. Next, working effects of the fuel cell stack 10 and the end plates 14 will be described below.

At the time of producing the fuel cell stack 10, as shown in FIG. 1, the plurality of power generation cells 12 are stacked together to form the stack body 16, and the end plates 14 are provided at both ends of the stack body 16. The end plates 14 apply a tightening load to the stack body 16 in the stacking direction.

Then, the joint members 78 are inserted into, and fixed to the plurality of holes 62 of the second end plate 14b, and the manifolds 72 are fixed to the joint members 78. Each hole 62 has a diameter which is sufficient to accommodate the fluid passage 46 of the power generation cell 12, and which is larger than the outer diameter of the manifold 72.

The inner openings 60b, 60d of the coolant outlet channel 80b are provided between the oxygen-containing gas inlet hole 68a and the two fuel gas outlet holes 70b, on the side of the second end plate 14b indicated by the arrow Ar. Likewise, the inner openings 60g, 60i of the coolant inlet channel 80a are provided between the fuel gas inlet hole 70a and the two oxygen-containing gas outlet holes 68b, on the side of the second end plate 14b indicated by the arrow Af. In this regard, the inner openings 60b, 60d, 60g, 60i are connected to the coolant supply passages 52a and the coolant discharge passages 52b without providing the joint members 78 for connecting the manifolds 72. In the structure, portions of the second end plate 14b itself are present between the holes 62 and the flow channels 64.

That is, in a front view, in the second end plate 14b, solid portions are present between the flow channels 64 and the plurality of holes 62 arranged on both sides in the direction indicated by the arrow A. In the structure, the strength of the portions of the second end plate 14b near the positions connected to the plurality of manifolds 72 (the oxygen-containing gas supply manifold 74a, the oxygen-containing gas discharge manifolds 74b, the fuel gas supply manifold 76a, the fuel gas discharge manifolds 76b) is increased sufficiently.

Further, in the second end plate 14b, the first lateral opening 82 of the coolant inlet channel 80a and the second lateral opening 84 of the coolant outlet channel 80b are provided on a surface of the second end plate 14b (side surface on the side indicated by the arrow Af) which is different from the surface where the outer openings 66 are present. That is, the first and second lateral openings 82, 84 on the surface which is different from the surface connected to the manifolds 72 are connected to a coolant supply manifold (not shown) and a coolant discharge manifold (not shown). Therefore, in the fuel cell stack 10, it is possible to easily provide devices (pipes, an injector, etc.) of a fuel gas system apparatus (not shown), and devices (pipes, a humidifier, etc.) of an oxygen-containing gas system apparatus (not shown) on the outside of the second end plate 14b in the stacking direction.

Further, for example, a coolant apparatus (not shown) for supplying the coolant is preferably placed on the side of the fuel cell stack 10 indicated by the arrow Af (the surface which is the same as the surface where the first and second lateral openings 82, 84 are formed). In the structure, in the fuel cell stack 10, it is possible to design the layout of each device more freely.

When the fuel cell stack 10 is used (when the fuel cell stack 10 performs power generation), the oxygen-containing gas, the fuel gas, and the coolant are supplied into the fuel cell stack 10 through the manifolds 72. The power generation cells 12 perform power generation based on electrochemical reactions of the oxygen-containing gas and the fuel gas, and the temperature of the power generation cells 12 is regulated by the coolant.

In this regard, as shown in FIG. 3A, the coolant is supplied from the coolant apparatus (the coolant supply manifold) to the first lateral opening 82 on the side surface of the second end plate 14b, flows through the coolant inlet channel 80a by a short distance, and then immediately flows into the coolant supply passages 52a of the stack body 16. Therefore, the coolant can cools each of the power generation cells 12 of the stack body 16 smoothly. Further, after the coolant cools the power generation cells 12, and flows into the coolant discharge passages 52b, the coolant returns to the second end plate 14b, and flows from the inner openings 60b, 60d into the coolant outlet channel 80b.

The coolant outlet channel 80b is connected from the inner openings 60b, 60d to the enlarged space 86 immediately, and the enlarged space 86 is expanded to occupy the majority part of the second end plate 14b in the surface directions. Therefore, the heated coolant flowing the enlarged space 86 is spread in the surface directions of the second end plate 14b, and heat exchange is performed between the coolant and the inner wall and the outer wall of the second end plate 14b. Thus, the temperature of the entire second end plate 14b is regulated. That is, in the second end plate 14b of the fuel cell stack 10, it is possible to regulate the temperature of the power generation cells 12 provided on the side indicated by the arrow B1 where the temperature tends to be changed easily, and it is possible to stably perform power generation. Further, the coolant which flowed through the coolant outlet channel 80b (enlarged space 86) is discharged into the coolant discharge manifold through the second lateral opening 84, and then flows back to the coolant apparatus in a circulating manner.

Figure 3B:
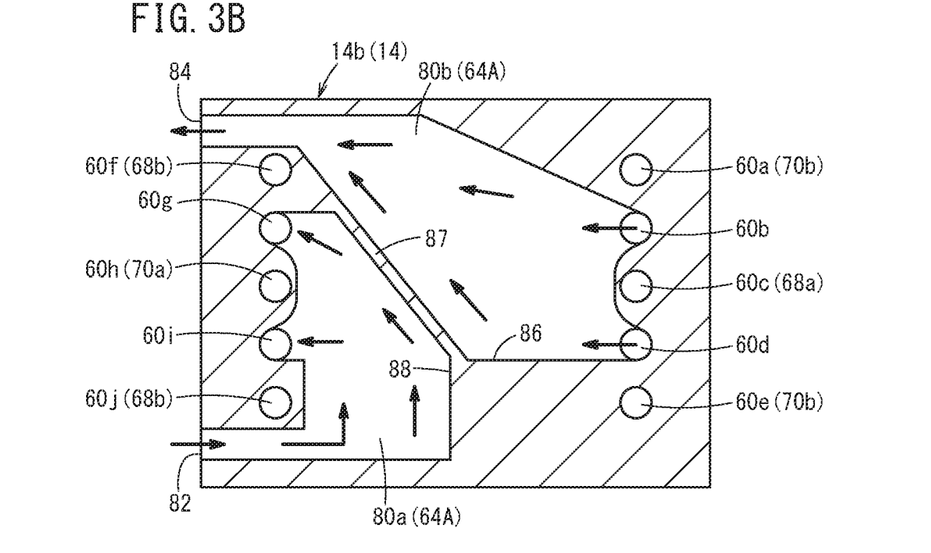
FIG. 3B is a cross sectional view showing flows of a coolant in flow channels according to a modified embodiment.

It should be noted that, in the second end plate 14b, the flow channels 64 (the coolant inlet channel 80a, the coolant outlet channel 80b) as the passages of the coolant are not limited to the shapes of the above embodiment, and may have various shapes. For example, in an end plate 14 (second end plate 14b) according to a modified embodiment shown in FIG. 3B, the shapes of flow channels 64A are different from the shapes of the flow channels 64 according to the first embodiment. Specifically, the coolant inlet channel 80a includes the first lateral opening 82 at a lower position on the lateral side of the second end plate 14b, and is formed in a detour space 88 which guides the coolant to flow around below the hole 62 on the side of the second end plate 14b indicated by the arrow Af. The detour space 88 and the enlarged space 86 of the coolant outlet channel 80b are isolated by a partition wall 87, and the partition wall 87 extends obliquely. Also in the flow channels 64A formed in this manner, the coolant can flow in the surface directions of the second end plate 14b, and it is possible to suitably regulate the temperature of the second end plate 14b.

Second Embodiment

Figure 4:
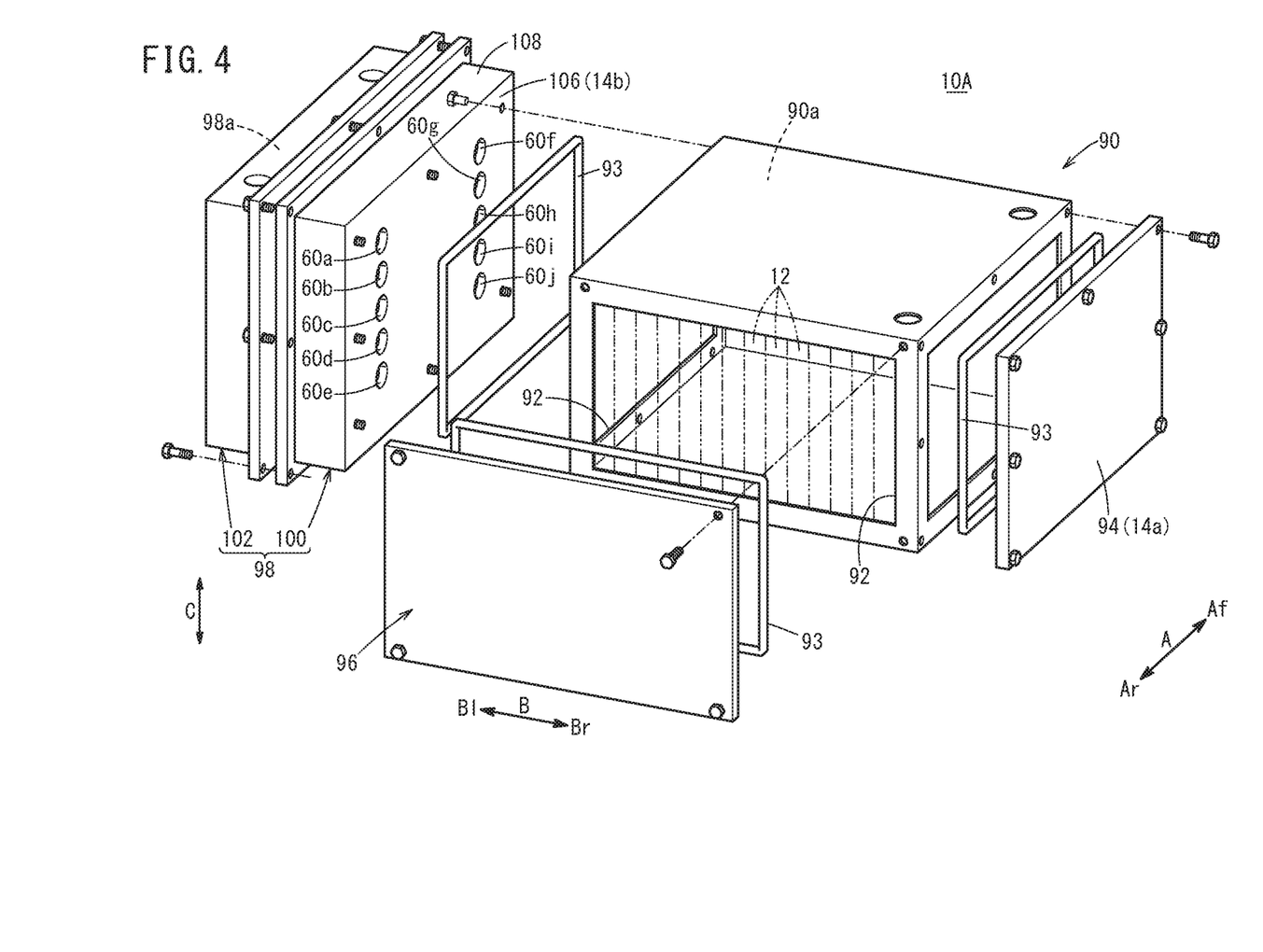
FIG. 4 is an exploded perspective view showing a fuel cell stack and end plates according to a second embodiment of the present invention.

As shown in FIG. 4, a fuel cell stack 10A according to a second embodiment is different from the fuel cell stack 10 according to the first embodiment in respect of the structure where the stack body 16 formed by stacking the plurality of power generation cells 12 together is placed in a stack case 90. In the following description, the constituent elements having the same structure or the same function as those of the above embodiment are labeled with the same reference numeral, and the detailed description thereof is omitted.

Windows 92 are provided on both side surfaces in a direction indicated by an arrow B and a rear surface of the stack case 90. The windows 92 are connected to an inner space 90a. A side wall 94 which closes the window 92 of the stack case 90 is attached to one side surface of the stack case 90 in the direction indicated by the arrow B in a manner that a seal member 93 is held between the side wall 94 and the stack case 90. This side wall 94 forms one end plate 14 (first end plate 14a) which applies a tightening load to the power generation cells 12 in the stacking direction. It should be noted that a rear wall 96 which closes the window 92 of the stack case 90 is attached to the rear surface of the stack case 90 in a manner that a seal member 93 is held between the rear wall 96 and the stack case 90.

Further, an auxiliary device case 98 is attached to the other side surface of the stack case 90 opposite to the one side surface in a manner that the auxiliary device case 98 closes the window 92 of the stack case 90. The auxiliary device case 98 is a protection member for protecting devices of a fuel cell system (see also FIG. 6A), and includes a recessed first case member 100 screwed to the stack case 90, and a recessed second case member 102 joined to the first case member 100. A storage space 98a for storing auxiliary devices 104 is formed inside the first case member 100 and the second case member 102.

Figure 6A:
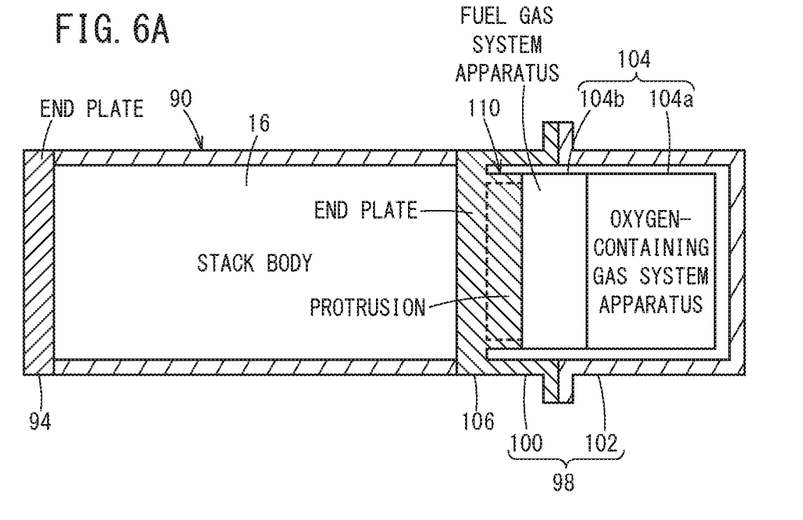
FIG. 6A is a front cross sectional view schematically showing structure of a fuel cell stack.

As shown in FIG. 6A, examples of the auxiliary devices 104 of the fuel cell system stored in the auxiliary device case 98 include devices of an air system (oxygen-containing gas system apparatus 104a) and a hydrogen system (fuel gas system apparatus 104b). Examples of the auxiliary devices 104 of the oxygen-containing gas system apparatus 104a include pipes, a humidifier, a gas liquid separator, valves, etc. (an air pump, etc. are provided outside the auxiliary device case 98). Examples of the auxiliary devices 104 of the fuel gas system apparatus 104b include pipes, an injector, a hydrogen pump, valves, etc.

Figure 5:
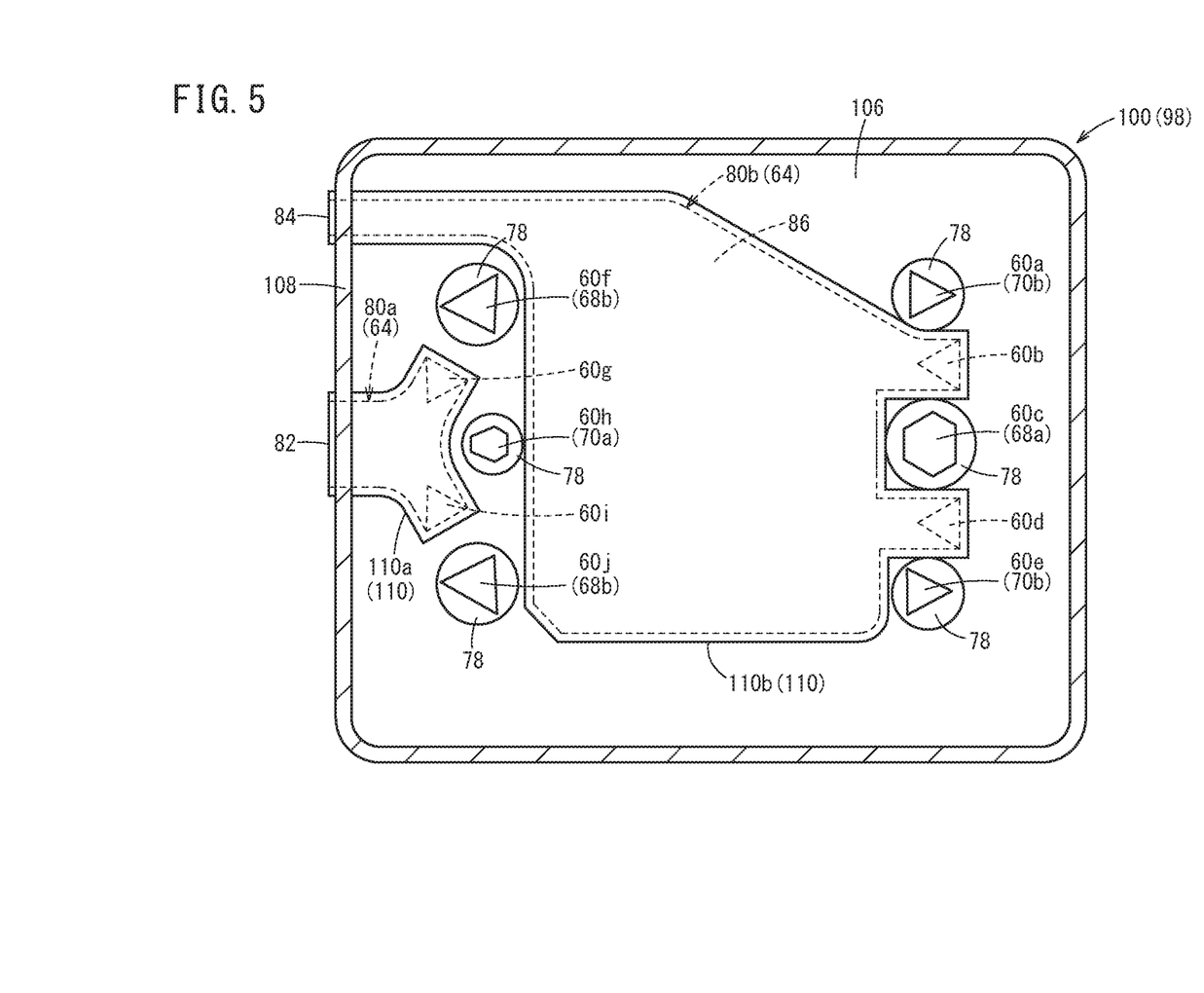
FIG. 5 is a side view showing a first case member of an auxiliary device case.

As shown in FIGS. 4 and 5, the first case member 100 includes an attachment wall 106 joined to the stack case 90, and a peripheral wall 108 extending outward of the stack case 90 from the periphery of the attachment wall 106. At the time of producing the fuel cell stack 10A, the attachment wall 106 is fixed to close the window 92 of the stack case 90 on the side indicated by the arrow B1 in a manner that the seal member 93 is held between the attachment wall 106 and the stack case 90. Then, as in the case of the second end plate 14b according to the first embodiment, the attachment wall 106 of the first case member 100 functions as an end plate 14 for applying a tightening load to the power generation cells 12 in the stacking direction.

The attachment wall 106 has a plurality of inner openings 60a to 60j connected to the plurality of fluid passages 46 (the oxygen-containing gas supply passage 48a, the oxygen-containing gas discharge passages 48b, the fuel gas supply passage 50a, the fuel gas discharge passages 50b, the coolant supply passages 52a, and the coolant discharge passages 52b) of the power generation cells 12. The oxygen-containing gas inlet hole 68a is connected to the inner opening 60c, the two oxygen-containing gas outlet holes 68b are connected to the inner openings 60f, 60j, the fuel gas inlet hole 70a is connected to the inner opening 60h, and the two fuel gas outlet holes 70b are connected to the inner openings 60a, 60e. Further, the coolant inlet channel 80a is connected to the inner openings 60g, 60i, and the coolant outlet channel 80b is connected to the inner openings 60b, 60d.

Further, the attachment wall 106 includes a plurality of protrusions 110 (a first protrusion 110a and a second protrusion 110b) on a space side (on a side opposite to the surface facing the power generation cells 12). The first and second protrusions 110a, 110b are formed integrally with the attachment wall 106, and the first and second protrusions 110a, 110b and the attachment wall 106 jointly function as the second end plate 14b. Further, the first and second protrusions 110a, 110b are formed independently from each other inside the peripheral wall 108. The first and second protrusions 110a, 110b are formed by casting in a manner that the first and second protrusions 110a, 110b have a low height in comparison with the peripheral wall 108. Further, the coolant inlet channel 80a is formed inside the first protrusion 110a, and the coolant outlet channel 80b is formed inside the second protrusion 110b.

That is, the first protrusion 110a is a channel wall of the end plate 14 forming the coolant inlet channel 80a between the attachment wall 106 and the first protrusion 110a. In the structure, the first protrusion 110a is provided in a contiguous manner at a vertically intermediate position of the side surface (peripheral wall 108) of the first case member 100 on the side indicated by the arrow Af, extends by a short distance in the direction indicated by the arrow A, and is overlapped with the inner openings 60g, 60i in a front view. In the first protrusion 110a, the first lateral opening 82 of the coolant inlet channel 80a is formed in a portion of the first protrusion 110a slightly protruding from the peripheral wall 108.

Likewise, the second protrusion 110b is a channel wall of the end plate 14 forming the coolant outlet channel 80b between the attachment wall 106 and the second protrusion 110b. The second protrusion 110b is provided at an upper position of the side surface of the first case member 100 in a contiguous manner. The second protrusion 110b extends beyond the holes 62 in the direction indicated by the arrow B, and is widely expanded from the position beyond the holes 62 in the surface directions of the attachment wall 106. In the second protrusion 110b, the second lateral opening 84 of the coolant outlet channel 80b is formed in a portion of the second protrusion 110b slightly protruding from the peripheral wall 108.

Figure 6B:
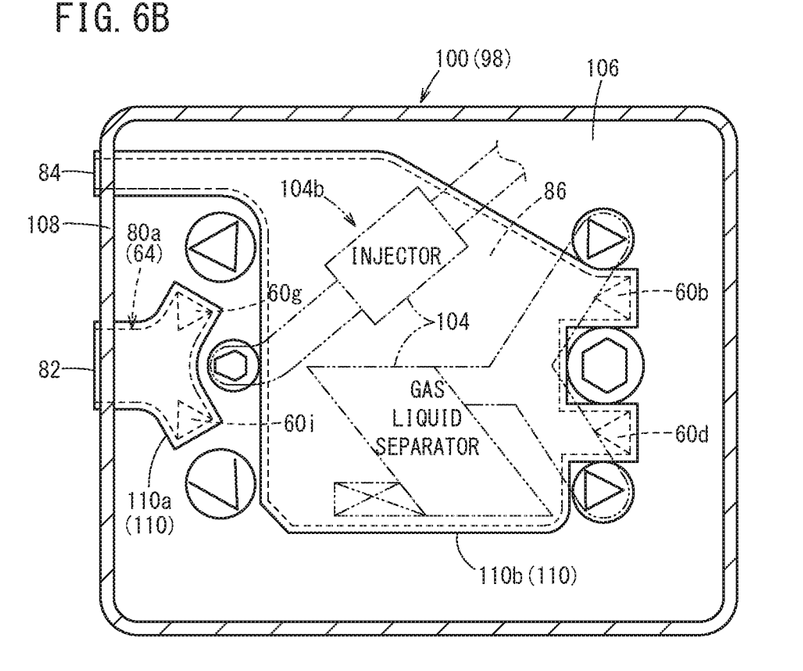
FIG. 6B is a view schematically showing a fuel gas system apparatus provided at a position adjacent to a protrusion.

Further, as shown in FIG. 6B, the manifold 72 (auxiliary device 104) is stored in the auxiliary device case 98, and the manifold 72 is connected to the holes 62 which are partially surrounded by the protrusion 110. The auxiliary devices 104 of the fuel gas system apparatus 104b are provided as first layer units, at positions adjacent to the first and second protrusions 110a, 110b, in the auxiliary device case 98. Further, the auxiliary devices 104 of the oxygen-containing gas system apparatus 104a are provided as second layer units, at positions outside, and adjacent to the first layer units.

Therefore, the protrusion 110 of the end plate 14 can heat the auxiliary devices 104 of the fuel gas system apparatus 104b as shown in FIG. 6B, by the coolant flowing through the flow channels 64 (mainly, the coolant outlet channel 80b). That is, the protrusion 110 functions as a hot water riser which warms water produced in the pipes, the gas liquid separator, the valves, the water storage, etc. of the fuel gas during power generation of the fuel cell stack 10A.

For example, in the fuel cell stack 10A, when the ambient air temperature becomes low (the freezing temperature or less), the heat of the heated coolant is transmitted to devices of the fuel gas system apparatus 104b through the second protrusion 110b. In this manner, it is possible to prevent freezing of the water in the devices, and suitably perform operation of the fuel cell stack 10A. It is a matter of course that the layout of the auxiliary devices 104 of the fuel cell system is applicable to the fuel cell stack 10 according to the first embodiment.

As described above, the fuel cell stacks 10, 10A, and the end plates 14 (the second end plate 14b and the attachment wall 106) according to the present invention offer the following advantages.

The fuel cell stacks 10, 10A, and the end plates 14 include the holes 62 and the flow channels 64, and the flow channels 64 include channel ports (the first and second lateral openings 82, 84) opened to a surface which is different from the surface where the holes 62 are opened. Accordingly, it is possible to design the layout of providing the manifolds 72 more freely. That is, in the surface of the end plate 14 where the holes 62 are opened, the number of the manifolds 72 connected to the holes 62 is reduced. Therefore, the layout of the manifolds 72 is simplified. Accordingly, at the time of production, assembling of the manifolds 72 is simplified, the production efficiency is improved, and reduction of the production cost is achieved. In particular, portions of the end plate 14 itself are present between the adjacent holes 62, near the positions on the end plate 14 connected to the manifolds 72. Therefore, the strength of the portions of the end plate 14 near the holes 62 is increased significantly, and it is possible to suitably supply the fuel gas, the oxygen-containing gas, and the coolant to the fluid passages 46, and discharge the fuel gas, the oxygen-containing gas, and the coolant from the fluid passages 46, through the holes 62. The strength of the portions of the end plate 14 near the positions connected to the manifolds 72 is increased. Thus, it becomes possible to design the end plate 14 itself to have the reduced thickness, and obtain the sufficient available space in the vicinity of the fuel cell stacks 10, 10A.

Further, the flow channels 64 and the third fluid passages (the coolant supply passages 52a and the coolant discharge passages 52b) are preferably passages of the coolant. In the structure, it is possible to suitably supply the coolant to, and discharge the coolant from the power generation cells 12. The coolant cools the power generation cells 12, and as a result, can regulate the temperature of the end plate 14 itself.

Preferably, the flow channel 64 includes an enlarged space 86 expanded in the surface directions of the end plate 14 and having a channel cross sectional area which is larger than the opening area of the second lateral opening 84. The coolant flows in this enlarged space 86. Thus, it is possible to exchange the heat in a wide area of the end plate 14.

The flow channel 64 preferably includes the coolant inlet channel 80a for supplying the coolant to the power generation cells 12, and the coolant outlet channel 80b for discharging the coolant from the power generation cells 12, and the enlarged space 86 is preferably provided in the coolant outlet channel 80b. In the structure, the coolant heated by the power generation cells 12 flows in the enlarged space 86 of the end plate 14, and it is possible to suitably heat the end of the power generation cells 12 in the stacking direction where the temperature tends to be lowered.

Preferably, at the position adjacent to the end plate 14 having the flow channels 64, the device of the fuel gas system apparatus 104b for supplying the fuel gas to the power generation cells 12 and discharging the fuel gas consumed in power generation from the power generation cells 12 is provided. In the structure, it is possible to also regulate the temperature of the device of the fuel gas system apparatus 104b by the coolant flowing inside the end plate 14. For example, by heating water which is present inside the pipes of the fuel gas system apparatus 104b, it becomes possible to suppress freezing.

Preferably, the inner openings 60a, 60c, 60e, 60f, 60h, 60j of the holes 62 and the inner openings 60b, 60d, 60g, 60i of the flow channels 64 are arranged alternately on the surface of the end plate 14 facing the power generation cells 12, in a direction substantially perpendicular to the stacking direction. In the structure, sufficient space is created around the holes 62 of the end plate 14, and it is possible to design the layout of the manifolds 72 connected to the holes 62 more freely.

Preferably, the joint members 78 for sealing the manifold 72 are provided in the holes 62, and the joint members 78 are not provided near the inner openings 60b, 60d, 60g, 60i of the flow channels 64. Accordingly, it is possible to firmly connect the manifolds 72 to the holes 62 in an air-tight manner, and since no joint members 78 are provided in the flow channels 64, it is possible to reduce the number of component parts.

The end plate 14 may have the protrusion 110 having the flow channels 64 inside the protrusion 110, on the surface opposite to the surface facing the power generation cells 12. Also in the case where the end plate 14 is provided with the protrusion 110, it is possible to form the flow channels 64 easily, and it becomes possible to improve the strength of the end plate 14.

At the end of the power generation cells 12 in the stacking direction, the auxiliary device case 98 storing the device for allowing the fuel gas, the oxygen-containing gas, or the coolant to flow through the power generation cells 12 may be provided, and the attachment wall 106 for attachment of the auxiliary device case 98 stacked on the power generation cells 12 may form the end plate 14. In this manner, also in the case where the attachment wall 106 of the auxiliary device case 98 forms the end plate 14, it is possible to apply the tightening load to the plurality of power generation cells 12, and allow the fluid to flow suitably through the flow channels 64.

It should be noted that the present invention is not limited to the above-described embodiments, and various modifications can be made in accordance with the gist of the present invention. For example, the type of the fluid (the fuel gas, the oxygen-containing gas, and the coolant) flowing through the holes 62 and the flow channels 64 of the end plate 14 (second end plate 14b) are not particularly limited, and the fuel gas and the oxygen-containing may flow through the flow channels 64, and the coolant may flow through the holes 62.

The positions where the first and second lateral openings 82, 84 are formed can be designed freely. The first and second lateral openings 82, 84 may be formed on the rear surface (on the side indicated by the arrow Ar) or on the upper surface of the fuel cell stack 10. Further, the flow channel 64 may not have the enlarged space 86, and may have a substantially constant channel cross sectional area. The joint members 78 may not be provided in the holes 62, and the manifolds may be connected to the end plate 14 by a suitable joining method.

What is claimed is:

1. A fuel cell stack comprising:
   a plurality of power generation cells configured to perform power generation consuming a fuel gas and an oxygen-containing gas supplied to the power generation cells, the temperature of the power generation cells being regulated by a coolant supplied to the power generation cells; and
   an end plate provided at an end in a stacking direction in which the power generation cells are stacked together,
   wherein the power generation cells include first to third fluid passages configured to allow the fuel gas, the oxygen-containing gas, and the coolant to flow independently in the stacking direction,
   wherein the end plate comprises:
   holes which penetrate through the end plate in a thickness direction and are connected to the first and second fluid passages, and to which manifolds are connected; and
   a flow channel formed in the end plate, and connected to the third fluid passage,
   wherein the flow channel includes a channel port opened to a surface which is different from a surface where the holes are opened, and
   wherein the flow channel includes an enlarged space expanded in surface directions of the end plate and having a channel cross sectional area which is larger than an opening area of the channel port.

2. The fuel cell stack according to claim 1, wherein the flow channel and the third fluid passage are passages of the coolant.

3. The fuel cell stack according to claim 1, wherein the flow channel includes a coolant inlet channel configured to supply the coolant to the power generation cells and a coolant outlet channel configured to discharge the coolant from the power generation cells, and wherein the enlarged space is provided in the coolant outlet channel.

4. The fuel cell stack according to claim 2, wherein at a position adjacent to the end plate having the flow channel, a device of a fuel gas system apparatus configured to supply the fuel gas to the power generation cells and discharge the fuel gas consumed in power generation from the power generation cells is provided.

5. The fuel cell stack according to claim 1, wherein inner openings of the holes and inner openings of the flow channel are arranged alternately on a surface of the end plate facing the power generation cells, in a direction substantially perpendicular to the stacking direction.

6. The fuel cell stack according to claim 5, wherein joint members configured to seal the manifolds are provided in the holes, and the joint members are not provided near the inner openings of the flow channel.

7. The fuel cell stack according to claim 1, wherein the end plate includes a protrusion having the flow channel inside the protrusion, on a surface opposite to a surface of the end plate facing the power generation cells.

8. The fuel cell stack according to claim 1, wherein at an end of the power generation cells in the stacking direction, an auxiliary device case configured to store a device configured to allow the fuel gas, the oxygen-containing gas, or the coolant to flow through the power generation cells is provided, and an attachment wall for attachment of the auxiliary device case stacked on the power generation cells forms the end plate.

9. An end plate of a fuel cell stack provided at an end in a stacking direction in which a plurality of power generation cells are stacked together,
wherein the power generation cells include first to third fluid passages configured to allow a fuel gas, an oxygen-containing gas, and a coolant to flow independently in the stacking direction, and the power generation cells are configured to perform power generation consuming the fuel gas and the oxygen-containing gas supplied to the power generation cells, the temperature of the power generation cells being regulated by the coolant supplied to the power generation cells,
the end plate comprising:
holes which penetrate through the end plate in a thickness direction and are connected to the first and second fluid passages, and to which manifolds are connected; and
a flow channel formed in the end plate, and connected to the third fluid passage,
wherein the flow channel includes a channel port opened to a surface which is different from a surface where the holes are opened, and
wherein the flow channel includes an enlarged space expanded in surface directions of the end plate and having a channel cross sectional area which is larger than an opening area of the channel port.

\* \* \* \* \*